United States Patent [19]

Juzwiak

[11] Patent Number: 5,340,214
[45] Date of Patent: Aug. 23, 1994

[54] PUG MILL MIXER

[75] Inventor: John H. Juzwiak, Ivyland, Pa.

[73] Assignee: Conversion Systems, Inc., Horsham, Pa.

[21] Appl. No.: 984,907

[22] Filed: Dec. 2, 1992

[51] Int. Cl.$^5$ .................................................. B01F 7/04
[52] U.S. Cl. ............................................ 366/292; 366/299
[58] Field of Search ............... 366/40, 64, 66, 297, 366/298, 299, 300, 301, 325, 603, 292, 168

[56] References Cited

U.S. PATENT DOCUMENTS

| | | | |
|---|---|---|---|
| 731,073 | 6/1903 | Rust | 366/83 |
| 1,290,505 | 1/1919 | Bulley | 366/83 |
| 1,433,865 | 10/1922 | Wolf | 366/300 |
| 2,445,919 | 7/1948 | Mitchell | 366/297 |
| 2,726,852 | 12/1955 | Sommer | 366/66 |
| 2,845,255 | 7/1958 | Herr . | |
| 2,917,395 | 12/1959 | Csanyi | 366/301 |
| 3,129,927 | 4/1964 | Mast . | |
| 3,244,408 | 4/1966 | Brownlie et al. | 366/300 |
| 3,343,814 | 9/1967 | Mund | 366/300 |
| 3,746,311 | 7/1973 | Harper et al. . | |
| 3,964,874 | 6/1976 | Maruko et al. . | |
| 4,014,525 | 3/1977 | Oda et al. . | |
| 4,176,969 | 12/1979 | Wallace et al. | 366/300 |
| 4,474,479 | 10/1984 | Redelman | 366/300 |
| 4,493,557 | 1/1985 | Nayak et al. | 366/300 |
| 4,509,862 | 4/1985 | High et al. | 366/158 |
| 4,697,750 | 10/1987 | Prew | 366/300 |
| 4,758,095 | 7/1988 | Kanda et al. | 366/66 |
| 4,765,747 | 8/1988 | High, Jr. et al. | 366/603 |
| 4,779,992 | 10/1988 | Underwood | 366/137 |
| 4,791,735 | 12/1988 | Torberg | 366/149 |
| 4,801,433 | 1/1989 | Yamanaka et al. | 366/137 |
| 4,996,930 | 3/1991 | Yip et al. | 110/245 |
| 5,048,971 | 9/1991 | Wall et al. | 366/85 |
| 5,161,888 | 11/1992 | Hauck | 366/300 |

OTHER PUBLICATIONS

Product Literature Entitled "The Benetech/Feeco Dustmaler" from Benetech, Inc. of Aurora, Ill. & from Feeco International of Green Bay, Wis.
Product Literature Entitled "The Feeco Paddle Mixer" from Feeco International of Green Bay, Wis.

*Primary Examiner*—David A. Scherbel
*Assistant Examiner*—Reginald L. Alexander
*Attorney, Agent, or Firm*—Ratner & Prestia

[57] ABSTRACT

An improved pug mill mixer including at least one homogenizer shaft extending transverse to the direction of the pug mill shafts for providing a zone of high shear mixing. The pug mill mixer of the present invention is particularly well-suited to mix dry, fine powders with liquids and pasty, sticky sludges, such as flue gas desulfurization (FGD) sludge. The mixer includes a container, within which is disposed at least one pug mill shaft having a series of pug mill paddles coupled to and radially protruding from the pug mill shafts for mixing the mixture and transporting the mixture along the pug mill shafts. The homogenizer shafts extend in a direction transverse to the pug mill shafts. Homogenizer mixing elements are coupled to and radially protrude from the homogenizer shafts. The homogenizer shafts rotate at a relatively high speed for producing a zone of high shear mixing. A liquid injection nozzle injects liquid into the container near the feed port of the container.

17 Claims, 7 Drawing Sheets

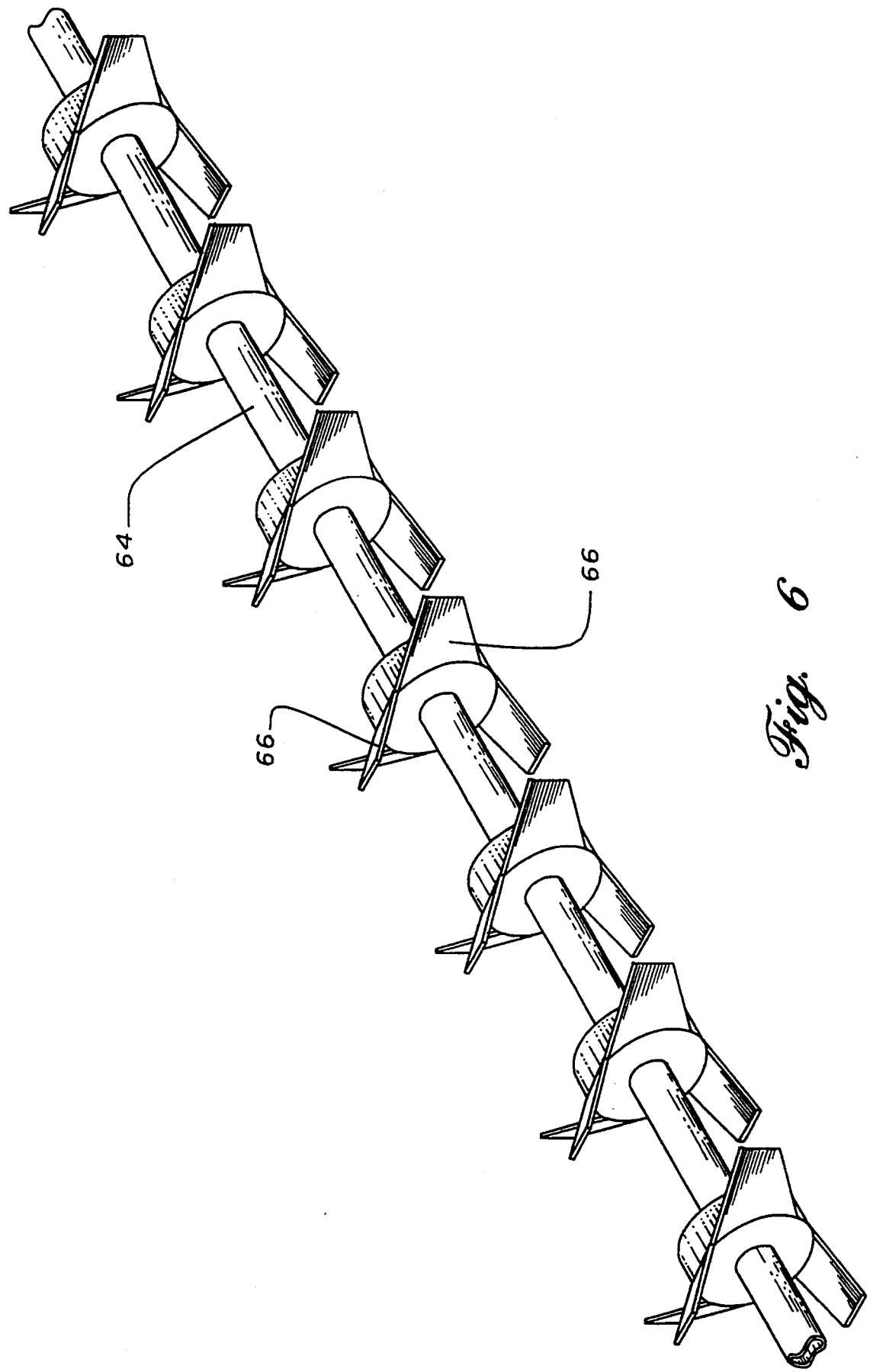

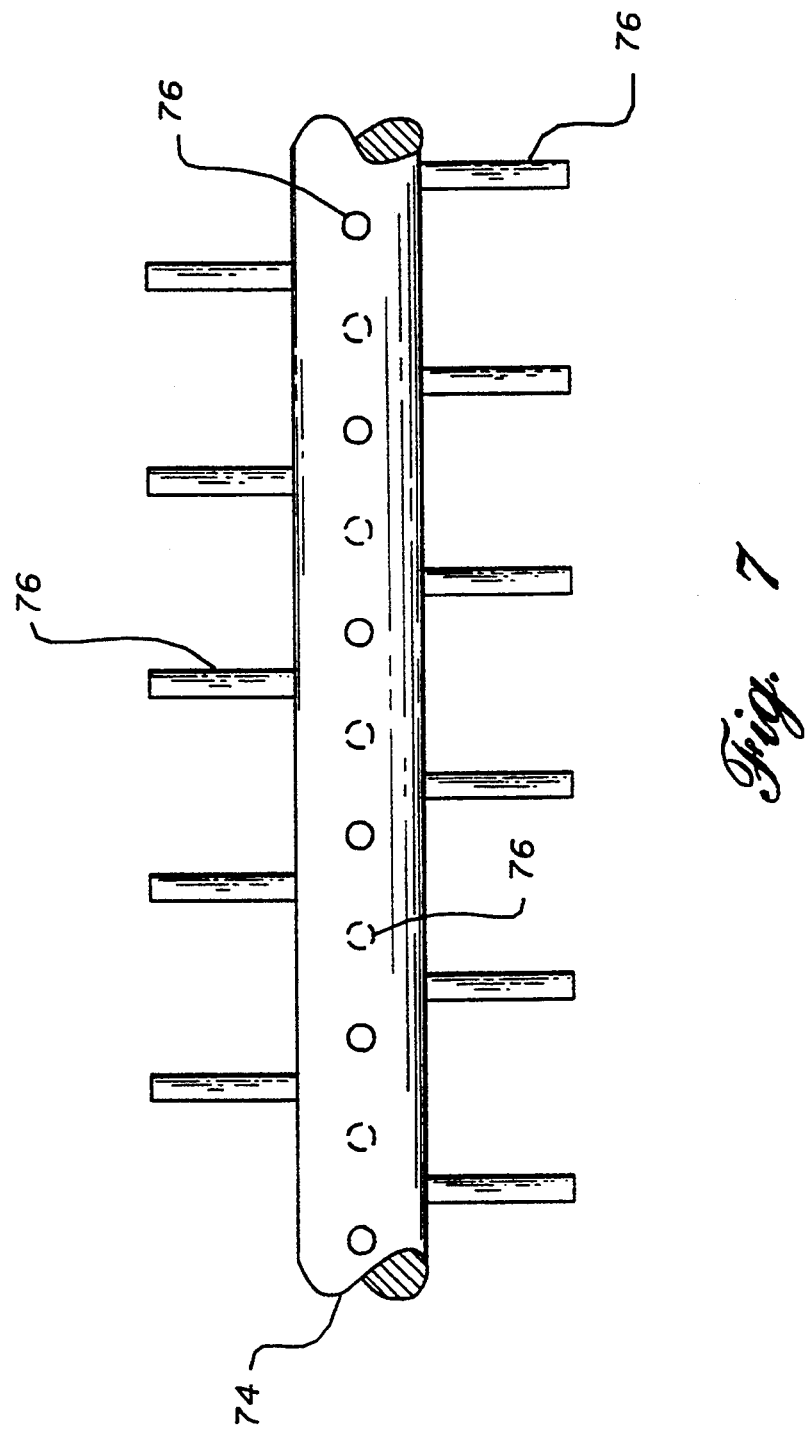

PUG MILL MIXER

FIELD OF THE INVENTION

The present invention relates generally to pug mill mixers. In particular, the present invention relates to improved pug mill mixers for mixing components, including a fine powder, a liquid, and a pasty sludge, such as flue gas desulfurization (FGD) sludge.

BACKGROUND OF THE INVENTION

Presently, there is a need to mix dry, fine powders with liquids and pasty, sticky sludges. This need exists in the stabilization of FGD sludges with finely ground lime, water and fly ash. Current practice is to utilize pug mill mixers to accomplish this mixing.

A conventional pug mill mixer is essentially a container, or tank, within which two counter rotating pug mill shafts are disposed. A series of pug mill paddles, or "pugs," are attached to the pug mill shafts and radially protrude from the pug mill shafts. Separate streams of constituent ingredients are introduced into the pug mill mixer top at one end and the angled pug mill paddles fold the material as it is mixed and transport the material along the axis of the pug mill shafts to the exit end of the mixer. There, the material is discharged through the bottom of the mixer.

In the past, stabilized FGD sludge has been disposed of, such as by placing the cementitiously hardened product in a landfill. It is known that pug mill mixers in some cases do not produce a homogeneous mixture. For example, material mixed by a conventional pug mill mixer which is subsequently cured typically includes white balls ½ inch in diameter, and, in some cases, as large as one or two inches in diameter. These white balls are known to be FGD filter cake which is a highly cohesive, pasty material. The presence of such balls of FGD filter cake in the final cured mass decreases its strength and increases its permeability. Although this problem is often tolerable when the cementitiously hardened product is simply discarded, the lack of homogeneous mixing is intolerable when the FGD sludge is used to make synthetic aggregate or if the final cured landfill material is required to be extremely strong or to have a low permeability.

Pin mixers also have been used to mix dry powders with liquids. The flow of material is along the axis of the pin mixer as with pug mill mixers. Pin mixers are not designed for sticky, cohesive sludges, such as FGD sludge.

In addition, batch mixers have been utilized to mix dry, fine powders with liquids and pasty, sticky sludges. Some batch mixers use small chopper blades or high shear mixer blades in the side of the mixer; however, such mixers are primarily batch type and are relatively expensive.

There still exists a need for a mixer capable of homogenizing dry, fine powders with liquids and pasty, sticky sludges. Preferably, such a mixer should provide a zone of high shear mixing so that the formation of cohesive balls of one of the feed components is minimized. In this way, a mixer would be useful for homogeneously mixing FGD sludge, fly ash, lime and water in a process for making synthetic aggregate. Such a mixer should also be capable of continuous operation.

SUMMARY OF THE INVENTION

The present invention is an improved pug mill mixer including at least one homogenizer shaft extending in a direction transverse to the pug mill shafts and rotating at a relatively high speed for providing a section of high shear mixing. In particular, the mixer of the present invention includes a container for containing a mixture and having at least one feed port through which components of the mixture are fed to the container. The mixer also includes at least one pug mill shaft and pug mill paddles coupled to and radially protruding from the pug mill shafts for mixing the mixture and transporting the mixture along the pug mill shafts as the mixture is mixed. The homogenizer shafts of the present invention extend transverse to the direction of the pug mill shafts and include homogenizer mixing elements coupled to and radially protruding from the homogenizer shafts.

Preferably, the mixer includes two parallel pug mill shafts, which rotate in opposite rotational directions and two parallel homogenizer shafts. Alternatively, the mixer may include three parallel homogenizer shafts. The homogenizer shafts are preferably spaced along the pug mill shafts at equal distances from one another and from both ends of the container.

The pug mill paddles may be arranged in a series of pug mill paddle sets, with each pug mill paddle set including at least two pug mill paddles evenly spaced around the pug mill shafts, and with each pug mill paddle set evenly spaced along the length of the pug mill shafts. Similarly, the homogenizer mixer elements may be arranged in a series of homogenizer mixing element sets, with each homogenizer mixing element set including at least two homogenizer mixing elements evenly spaced around the homogenizer shafts, and with each homogenizer mixing element set evenly spaced along the length of the homogenizer shafts.

Preferably, the homogenizer mixing elements are arranged in a spiral evenly spaced around the homogenizer shaft with no axial space between adjacent homogenizer mixing elements. With this design, the planes formed by the rotation of adjacent homogenizer mixing elements overlap or abut one another. This configuration of homogenizer mixing elements prevents any material from passing through the homogenizer section without contacting at least one of the homogenizer mixing elements. In one such embodiment, adjacent homogenizer mixing elements are disposed 90° apart around the homogenizer shaft.

Preferably, the pug mill paddle sets are interrupted at an area near the homogenizer shafts to accommodate the homogenizer shafts. Also, each of the pug mill paddles may be inclined at an angle from 30° to 60° from an axis that is both perpendicular to the axis of the pug mill shaft and perpendicular to the axis of that pug mill paddle. The homogenizer mixing elements may be rods or bars, which are threaded at one end and fit within threaded recesses within the homogenizer shafts. Alternatively, the homogenizer mixing elements may be bolted chopper blades with each homogenizer mixing element set including four bolted chopper blades.

In another embodiment of the present invention, the mixer is adapted to mix components including a liquid, a pasty sludge and a dry, fine powder. The container may have a rectangular, horizontal cross section with a length and a width and may include a feed port through which the components are fed to the container and a discharge port through which the mixed material exits the container. In this embodiment, the mixer includes at least one pug mill shaft extending in a first direction parallel to the length of the container from the feed port to the discharge port.

As in previous embodiments, the pug mill paddles in this embodiment are coupled to and radially protrude from the pug mill shafts and serve to gently blend the material to form a mixture and transport the mixture in the first direction from the feed port to the discharge port. The mixer includes at least one homogenizer shaft which extends in a second direction parallel to the width of the container and which is disposed in a region through which the mixture is transported by the pug mill shafts and paddles; thus, the homogenizer shafts extend transverse to the pug mill shafts. As in previous embodiments, a series of homogenizer mixing elements are coupled to and radially protrude from the homogenizer shafts. The homogenizer mixing elements with a relatively high rotational speed provide a zone of high shear mixing.

BRIEF DESCRIPTION OF THE DRAWINGS

This invention is best understood from the following detailed description, when read in connection with the accompanying drawing, in which:

FIG. 6 is a perspective view of a homogenizer shaft of an alternative embodiment of the present invention; and FIG. 7 is a side view of a homogenizer shaft of another alternative embodiment of the present invention.

DETAILED DESCRIPTION OF THE INVENTION

The present invention is an improved pug mill mixer which includes at least one homogenizer assembly extending transverse to the longitudinal direction of the pug mill shafts. A homogenizer assembly consists of a homogenizer shaft and the attached homogenizer mixing elements, which radially protrude from the shaft. The axis of the homogenizer assembly lies within a horizontal plane, either above or below the pug mill shafts. The mixture is subjected to intense high shear mixing at the homogenizer sections, the region surrounding the homogenizer assembly.

In a particular embodiment, the mixer of the present invention produces homogeneous mixtures from a feed consisting of dry powder, a liquid and a sticky, cohesive sludge, such as flue gas desulfurization (FGD) sludge. In a system for stabilizing FGD sludge, FGD sludge is mixed with lime, fly ash and water. It is of critical importance that the mixture is homogeneous, or well-mixed, because, subsequent to mixing, the components cementitiously react with one another during a curing stage. This cementitious reaction requires the various components to be in close proximity. If, for example, a relatively large agglomeration of FGD filter cake passes through the mixer, the filter cake in the agglomeration will not be in close proximity with the other components and therefore will not be able to react with the other components. Any subsequently formed cementitiously hardened product will be severely weakened at the unreacted agglomerate.

Figure 2:
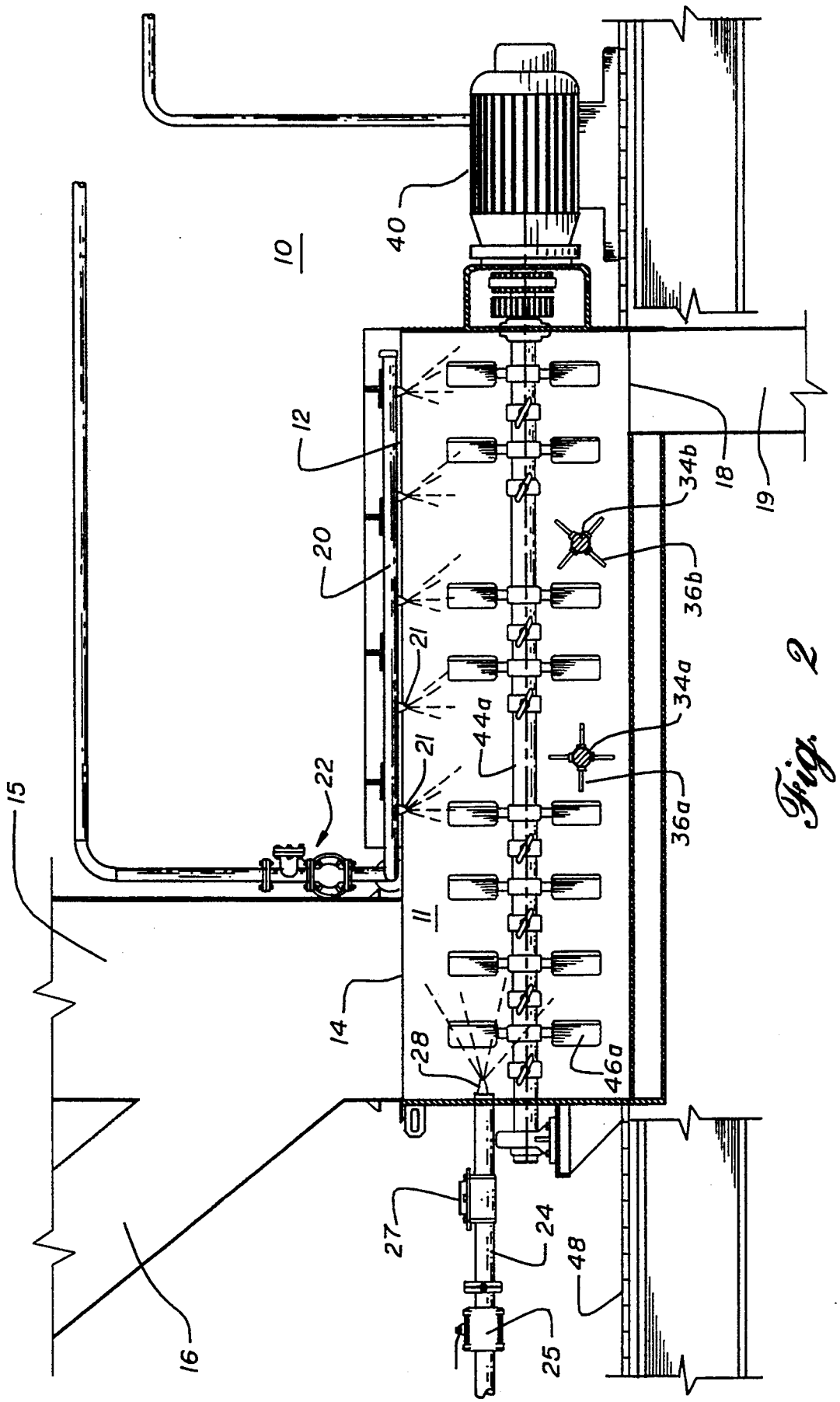
FIG. 2 is a partial cross-sectional side view of the mixer shown in FIG. 1.

The mixer 10 of the present invention includes a container 12 which defines a mixing chamber 11. Container 12 is capable of containing a mixture and includes a feed port 14, as shown in FIG. 2. In communication with feed port 14 are feed conduits 15 and 16. Connected to the other end of feed conduits 15 and 16 may be a conveying device, a metering element and a feed component source, such as a large tank or silo (not shown). For example, feed conduit 15 may be fed by a screw or belt conveyor, onto which a predetermined, measured flow rate of an individual component is fed from either another process stage or a storage tank or silo.

Container 12 also includes a discharge port 18, through which the mixture exits the container. Discharge port 18 is disposed at the bottom of container 12 at the end opposite from the feed port 14. Discharge port 18 leads to discharge conduit 19, which may conduct the mixture to a conveying device or to another processing unit. In the stabilization of FGD sludge, the mixture is conveyed to a temporary storage area from which it is hauled to a landfill where it is placed and compacted.

Liquid may be added to container 12 in one of two ways. First, liquid may be applied to the mixing chamber through spray bar 20 along the top of container 12. Liquid is sprayed through nozzles 21 from spray bar 20 to the mixing chamber. A conventional flow control valve and meter 22 are used to monitor the flow rate of the liquid.

Preferably, liquid is injected through a liquid feed conduit 24 at the feed end of the container 12. A conventional flow control valve 25 and meter 27 is used to monitor the liquid flow rate. Liquid proceeds through liquid feed conduit 24 to nozzle 28 and into the mixing chamber. Alternatively, liquid may be introduced through feed conduit 24 into the container without a nozzle. By adding the liquid at a controlled rate to the feed end of the container, an operator may control the consistency of the product, and a homogeneous product with little or no discernible differences in color and consistency results.

Figure 1:
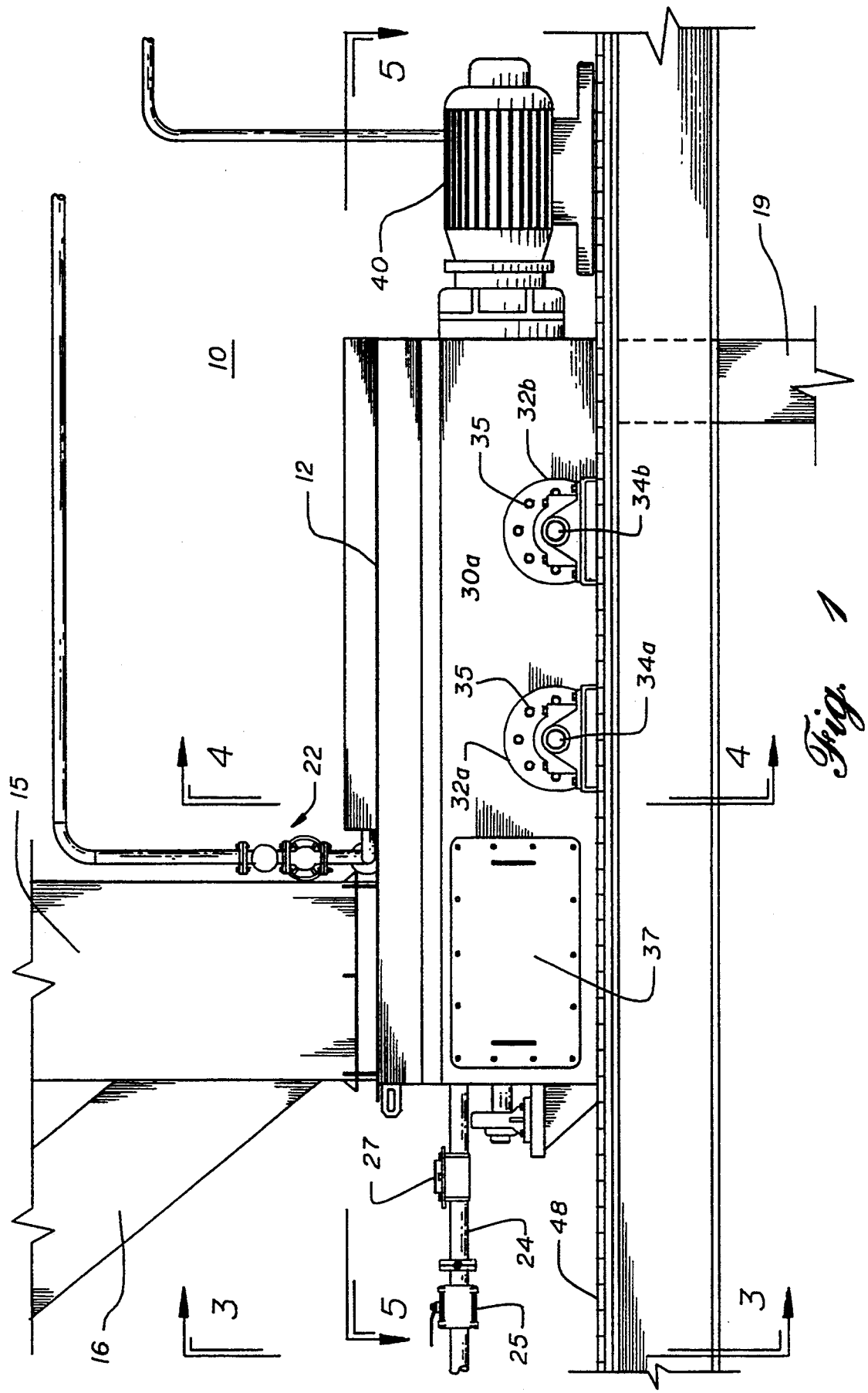
FIG. 1 is a side view of a mixer in accordance with the present invention.

Container 12 includes a first sidewall 30a, as shown in FIG. 1. Homogenizer shaft bearing assemblies 32a and 32b are used to support homogenizer shafts 34a and 34b, respectively, such that homogenizer shafts 34a,b can freely rotate with respect to the bearing assemblies.

Homogenizer shafts 34a,b are conventional rotary shafts for mixing. The homogenizer shaft bearing assemblies 32a,b are mounted to side 30a of container 12 by fasteners such as rivets or bolts 35.

In a preferred embodiment, the entire homogenizer assembly is easily removed. For example, this may be done by removing bolts 35 from sidewall 30a of container 12, which permits detachment of a flange leaving a hole sufficiently wide in diameter to simply pull the homogenizer assembly through the hole, after having detached the homogenizer shaft from the bearing at the other end.

Also mounted to sidewall 30a of container 12 is a panel 37. Panel 37 is removable for inspecting the mixing chamber, or for adding another feed conduit to the container.

Homogenizer shafts 34a,b are also shown in FIG. 2. Homogenizer shafts 34a,b extend through the mixing chamber from sidewall 30a to a sidewall 30b (shown in FIG. 4). A plurality of homogenizer mixing elements 36a and 36b are coupled to and radially protrude from the homogenizer shafts 34a and 34b, respectively. The homogenizer mixing elements may be cutters, rods, bars, paddles, blades, or any other conventional mixing element. For example, as shown in FIGS. 2, 4, 5 and 7 the homogenizer mixing elements are threaded rods which are engaged with threaded recesses within the homogenizer shafts.

In one embodiment, each of the homogenizer mixing element sets includes at least two of the homogenizer mixing elements evenly spaced around said homogenizer shaft, and the homogenizer mixing element sets are disposed near one another along the homogenizer shafts. In this embodiment, adjacent homogenizer mixing element sets are radially offset from one another.

Alternatively, FIG. 6 shows a homogenizer shaft 64 with a plurality of sets of bolted chopper blades 66, with each set including four bolted chopper blades 66. The planes formed by the rotation of adjacent blades overlap or abut one another. This configuration of blades prevents any material from passing through the homogenizer section without contacting at least one of the blades.

As shown in FIG. 2, a pug mill shaft 44a extends along the length of container 12 from the feed end to the discharge end. A plurality of pug mill paddles 46a are coupled to and radially protrude from pug mill shaft 44a. As shown in FIG. 2, the pug mill paddles 46a are disposed in pairs 180° apart Adjacent each pair of paddles is another pair of paddles which are angularly offset from the first pair by 90°. As shown in FIG. 2, the pug mill paddles 46a are inclined.

Figure 5:
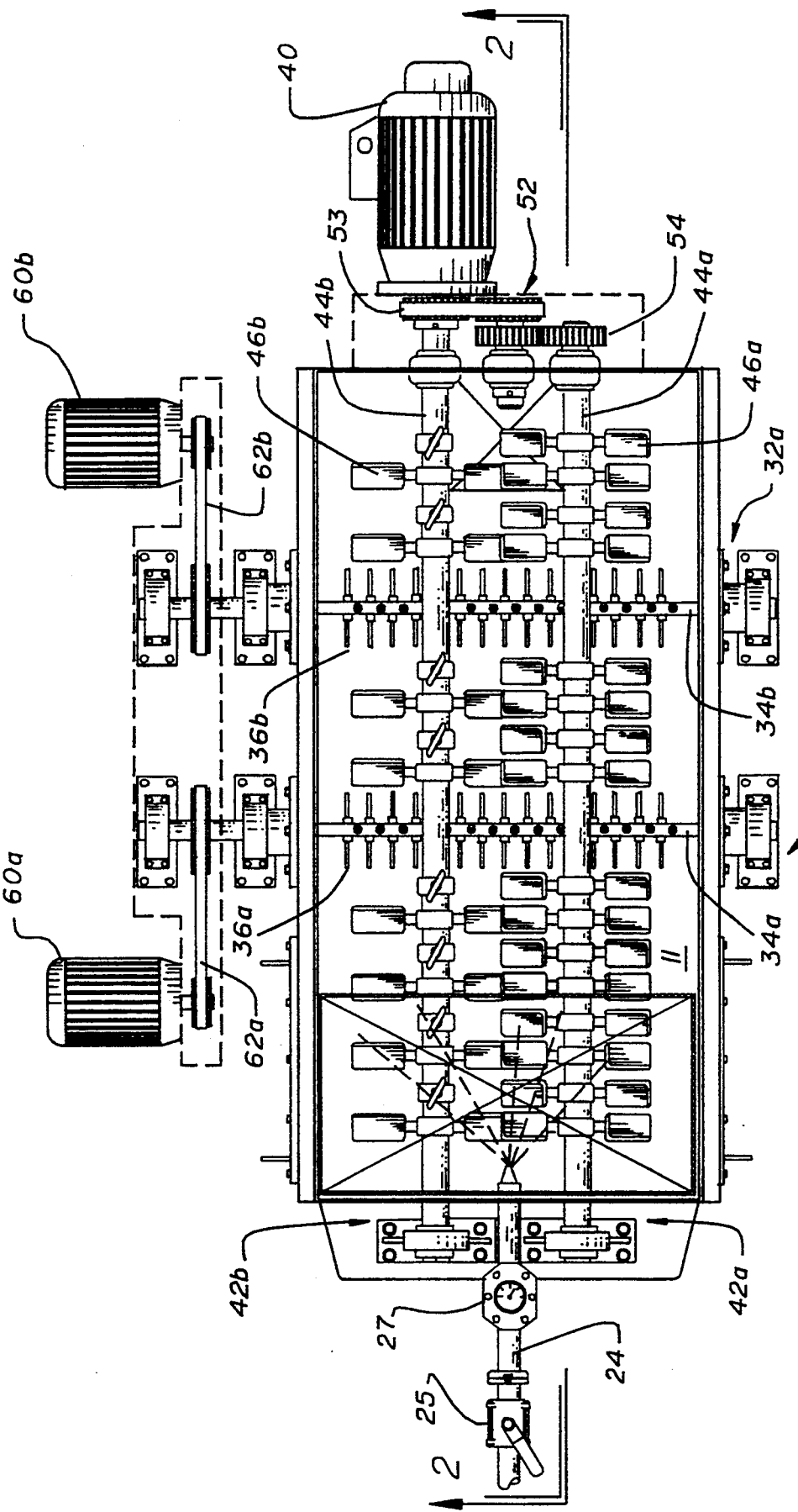
FIG. 5 is a cutaway top view of the mixer as viewed along the line 5—5 of FIG. 1.

Pug mill shaft 44a is driven by a pug mill drive unit 40, which may consist of an electric motor coupled to a speed reducer 52 (shown in FIG. 5). Pug mill drive unit 40 may be any conventional such unit, and the speed reducer should be capable of driving the pug mill shaft 44a at approximately 2.5 to 100 rpm.

Figure 3:
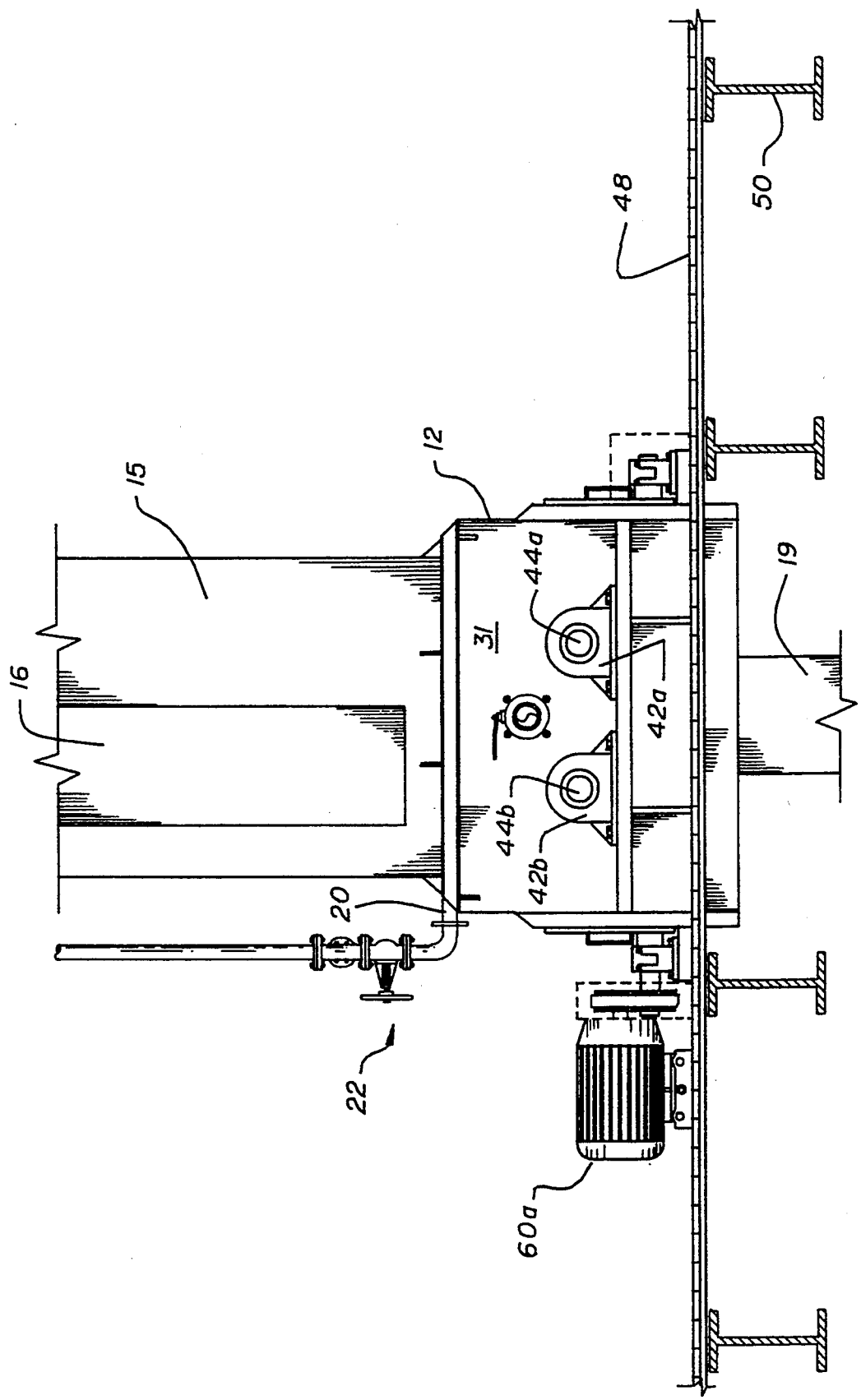
FIG. 3 is an end view of the mixer as viewed along the line 3—3 of FIG. 1.

As shown in FIGS. 1 and 2, the entire mixer 10 rests upon a platform 48. Alternatively, the mixer 10 may be placed on a floor. FIG. 3 shows I-beam supports 50, for supporting platform 48.

FIG. 3 shows the feed end wall 31 of container 12. In addition, FIG. 3 shows the pug mill shaft bearing assemblies 42a and 42b which provide support for pug mill shafts 44a and 44b, respectively. Pug mill shaft bearing assemblies 42a and 42b are similar in structure and function to homogenizer shaft bearing assemblies 32a and 32b.

Figure 4:
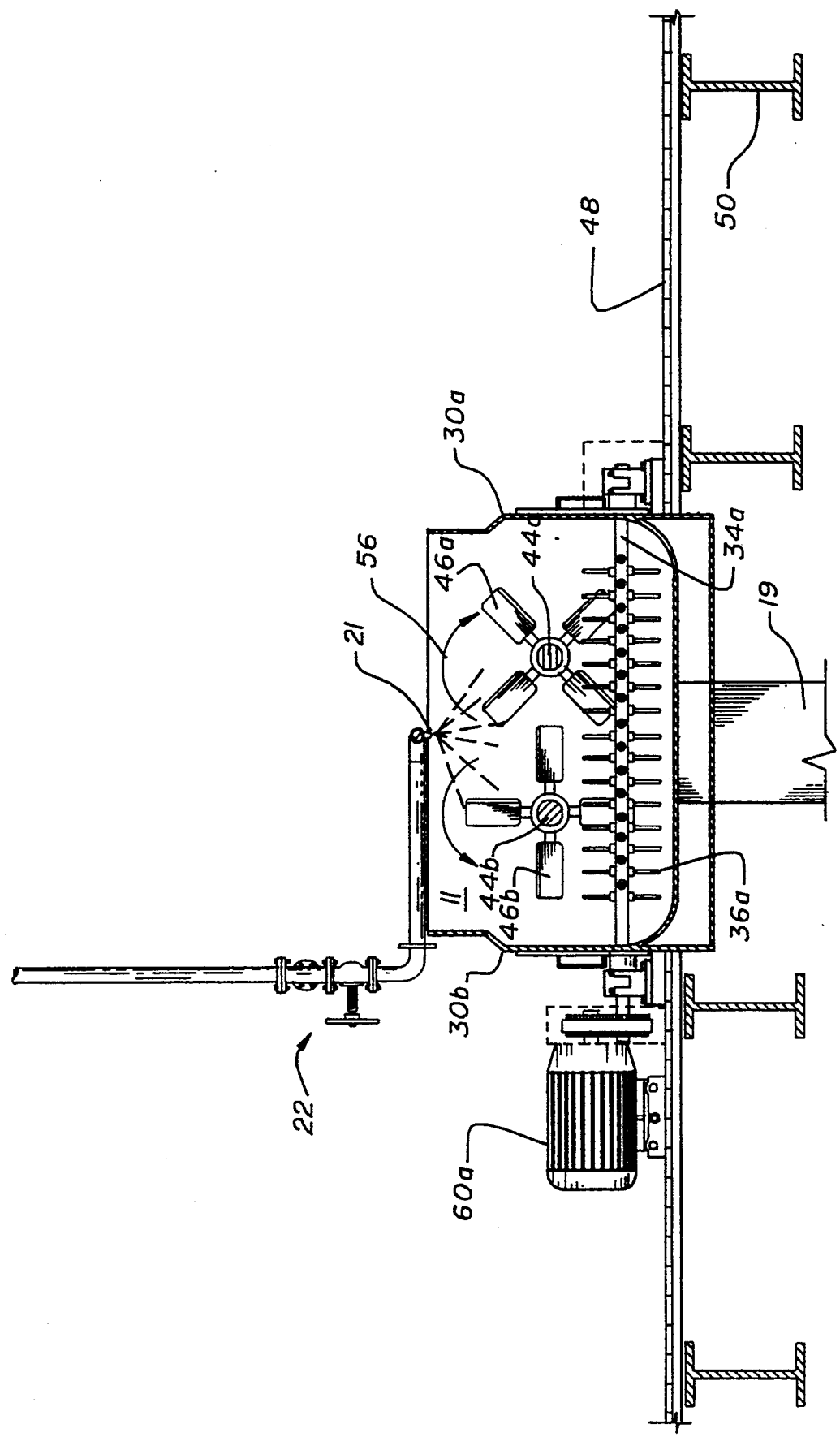
FIG. 4 is a partial cross-sectional view of the mixer as viewed along the line 4—4 of FIG. 1.

As shown in FIGS. 3 and 4, and more accurately FIG. 5, homogenizer shaft drive units 60a and 60b are provided. Drive units 60a,b may be any known conventional drive units, such as an electric motor coupled to speed reducers 62a,b. However, speed reducers 62a,b must be capable of rotating homogenizer shafts 34a,b at approximately 800 to 1500 rpm.

As shown in FIG. 4, the container may be curved to create a consistent clearance from the tips of the pugs and the wall of the container. This is done to reduce dead spots, where material is allowed to set unmixed.

FIG. 5 more clearly shows the relationships of some of the previously introduced elements. Pug mill shafts 44a and 44b with pug mill paddles 46a and 46b, respectively, are shown. The pug mill paddles are arranged in pairs as before. As previously stated, each pug mill paddle is slightly inclined from an axis that is both perpendicular to the axis of the pug mill shaft and perpendicular to the axis of that paddle. This inclination imparts a force on the mixture in the horizontal direction, which causes the mixture to be transported from the feed end to the exit end of container 12. In general, this angle of inclination should range from 30° to 60°.

As is well known, pug mill shafts 44a,b are mechanically connected to pug mill shaft drive unit 40. As shown in FIG. 5, pug mill drive unit 40 directly drives both pug mill shafts 44a,b and the drive unit causes pug mill shaft 44a to rotate in a direction opposite the direction of rotation of pug mill shaft 44b. Preferably, pug mill drive unit 40 causes the shafts to rotate in the direction of the arrows 56 shown in FIG. 4. This direction of rotation causes the mixture to be lifted up through the middle of the two pug mill shafts.

Speed reducer 52 may be any conventional speed reducer including a number of gears. As shown in FIG. 5, speed reducer 52 consists of gears 53 and 54, so that there is no relative rotation between the two pug mill shafts. This maintains a 45° offset between the two pug mill shafts, thereby keeping the two pug mill shafts in phase. Thus, as shown in FIG. 4, the two pug mill shafts are interleaved. This close proximity of the two pug mill shafts contributes to intimately mix the feed components.

FIG. 5 shows the two homogenizer shaft drive units 60a and 60b. By way of speed reducers 62a and 62b, the drive units rotate the homogenizer shafts 34a and 34b, respectively. As shown in FIG. 5, homogenizer mixing elements 36a,b are arranged in pairs which are spaced evenly around the homogenizer shafts. Adjacent pairs of homogenizer mixing element pairs are radially offset 90° from one another. This is a preferred embodiment of the invention as it serves to minimize any gaps along the length of the mixer through which a single feed component can pass without becoming homogenized.

In an alternative embodiment of the invention shown in FIG. 7, the homogenizer mixing elements are bars 76, which are arranged in a spiral pattern evenly spaced around the homogenizer shaft 74 with no axial space between adjacent bars 76. With this design, the planes formed by the rotation of adjacent bars overlap or abut one another. This configuration of bars 76 prevents any material from passing through the homogenizer section without contacting at least one of the bars 76.

An important aspect of the present invention is most clearly shown in FIGS. 2 and 4. In particular, the homogenizer shafts 34a,b should be located slightly below the pug mill shafts 44a,b, but in close proximity to the pug mill shafts. It is preferable to locate the homogenizer shafts below, instead of above, the pug mill shafts because the mixture generally proceeds from the feed end of the container to the discharge end below the pug mill shafts.

As shown, the pug mill paddles 46a,b are interrupted to accommodate the homogenizer shafts. Thus, the homogenizer shafts are within a region defined by the outer periphery of the pug mill paddles. Stated another way, the homogenizer shafts are disposed within a region through which the mixture is transported by the pug mill paddles.

The number of homogenizer shafts vary with the size of the mixer. Also, the number and spacing of the homogenizer mixing elements varies with the particular need.

A mixer of the present invention having dimensions of eleven feet, six inches in length, four feet, five inches in width and three feet in height has two homogenizer shafts three feet apart from one another, with one homogenizer shaft four feet, six inches from the feed end and the other homogenizer shaft two feet from the discharge end. The diameter of the homogenizer assembly is nine inches. In this mixer, the homogenizer mixing elements are arranged in a spiral pattern spaced 90° apart from one another around the homogenizer shaft. Each series of four homogenizer mixing elements are two inches apart from one another. This mixer also includes two pug mill shafts evenly spaced along the width of the mixer. Pug mill paddles are arranged in sets of pairs evenly spaced around the pug mill shafts. Adjacent sets of pairs of pug mill paddles are six inches apart from one another and are angularly offset from one another by 90°.

A second mixer of the present invention having dimensions of eleven feet, six inches in length, four feet, five inches in width and three feet in height has three homogenizer shafts two feet, eight inches apart and two feet, two inches apart from one another, with one homogenizer shaft one foot, six inches from the feed end. The diameter of the homogenizer assembly is ten inches. In this mixer, the homogenizer mixing elements are arranged in a spiral pattern spaced 90° apart from one another around the homogenizer shaft. Each series of four homogenizer mixing elements are two inches apart from one another. This mixer also includes two pug mill shafts evenly spaced along the width of the mixer. Pug mill paddles are arranged in sets of pairs evenly spaced around the pug mill shafts. Adjacent sets of pairs of pug mill paddles are six inches apart from one another and are angularly offset from one another by 90°.

In operation, the components, such as lime, fly ash and FGD sludge, are introduced to the mixer in controlled amounts through feed conduits 15 and/or 16. This material enters the mixer through feed port 14 and is combined with water from either spray nozzles 21, or, preferably, spray nozzle 28. The two counter-rotating pug mill shafts gently blend as well as transport the feed materials into a homogenizer section. The homogenizer sections subject the mixer to intense high shear mixing. The homogenizer mixing elements may be manufactured from corrosion or abrasion-resistant materials. The homogenizer section is followed by low shear mixing and then another homogenizer section. The combination of gentle, low shear mixing (by the pugs) and high shear mixing (by the homogenizer assembly) produces a highly homogeneous product.

Typically, in a cured mixture of lime, fly ash and FGD sludge mixed by the improved mixer of the present invention, the presence of white sludge balls is minimized. Generally, the white sludge balls evident in the cured mixture are on the order of ⅛" or less in diameter. These white sludge balls are unmixed FGD sludge and the absence of these balls is indicative of the degree of homogeneity in the mixture.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its true spirit and scope.

What is claimed is:

1. A mixer comprising:

a container for containing a mixture and having a feed port through which components of said mixture are fed to said container;

at least one pug mill shaft contained within said container and extending in a first direction;

a plurality of pug mill paddles coupled to and radially protruding from said at least one pug mill shaft for mixing said mixture and transporting said mixture in said first direction through a region, defined by the outer periphery of said plurality of pug mill paddles, as said mixture is mixed;

at least one homogenizer shaft contained within said container below said at least one pug mill shaft, disposed within said region, and extending in a second direction transverse to said first direction; and a plurality of homogenizer mixing elements coupled to and radially protruding from said at least one homogenizer shaft.

2. A mixer in accordance with claim 1, wherein:

said at least one pug mill shaft comprises two parallel pug mill shafts, which rotate in opposite rotational directions; and said at least one homogenizer shaft comprises two parallel homogenizer shafts.

3. A mixer in accordance with claim 1, wherein:

said at least one pug mill shaft comprises two parallel pug mill shafts, which rotate in opposite rotational directions; and said at least one homogenizer shaft comprises three parallel homogenizer shafts.

4. A mixer in accordance with claim 2 further including a liquid injection nozzle for injecting liquid into said container near said feed port.

5. A mixer in accordance with claim 2, wherein:

said plurality of pug mill paddles includes a plurality of pug mill paddle sets of pug mill paddles, wherein:

(a) each of said pug mill paddle sets comprises at least two of said pug mill paddles evenly spaced around said pug mill shafts, and (b) said plurality of pug mill paddle sets are evenly spaced along the length of said pug mill shafts; and said plurality of homogenizer mixing elements includes a plurality of homogenizer mixing element sets of homogenizer mixing elements, wherein:

(a) each of said homogenizer mixing element sets comprises at least two of said homogenizer mixing elements evenly spaced around said homogenizer shafts, and (b) said plurality of homogenizer mixing element sets are evenly spaced along the length of said homogenizer shafts.

6. A mixer in accordance with claim 5, wherein each of said pug mill paddles is disposed from 30 to 60 degrees from an axis that is both perpendicular to the axis of the pug mill shaft and perpendicular to the axis of said pug mill paddle.

7. A mixer in accordance with claim 5, wherein the evenly spaced pug mill paddle sets along the length of said pug mill shafts are interrupted at an area near said homogenizer shafts to accommodate said homogenizer shafts within a region through which said mixture is transported by said plurality of pug mill paddles.

8. A mixer in accordance with claim 5, wherein said homogenizer mixing elements are rods which are threaded at one end and said homogenizer shafts include threaded recesses for engaging said rods.

9. A mixer in accordance with claim 5, wherein said homogenizer mixing elements are bolted chopper blades and each of said homogenizer mixing element sets comprises four bolted chopper blades.

10. A mixer in accordance with claim 2, wherein said two homogenizer shafts are spaced equidistant in said first direction from one another and from both ends of said pug mill shafts.

11. A mixer in accordance with claim 1 wherein said first direction and said second direction lie within horizontal planes.

12. A mixer in accordance with claim 5, wherein:
each of said homogenizer mixing element sets includes at least two of said homogenizer mixing elements evenly spaced around said homogenizer shaft;
adjacent homogenizer mixing element sets are disposed near one another along said homogenizer shafts; and
homogenizer mixing elements of adjacent homogenizer mixing element sets are radially offset from one another.

13. A mixer in accordance with claim 5, wherein said homogenizer mixing elements are arranged in a spiral pattern evenly spaced around said homogenizer shaft with no axial space between adjacent homogenizer mixing elements.

14. A mixer in accordance with claim 1 further comprising means for rotating said at least one homogenizer shaft at 800 to 1500 rpm.

15. A mixer for mixing components including a fine powder, a liquid, and a pasty sludge, said mixer comprising:
a container having a rectangular horizontal cross-section with a length and a width for containing said components and having a feed port through which said components are fed to said container and a discharge port;
at least one pug mill shaft contained within said container and extending in a first direction parallel to the length of said container from said feed port to said discharge port;
a plurality of pug mill paddles coupled to and radially protruding from said at least one pug mill shaft for gently blending said components to form a mixture and for transporting said mixture through a region, defined by the outer periphery of said plurality of pug mill paddles, in said first direction to said discharge port through which said mixture exits said container;
at least one homogenizer shaft extending in a second direction parallel to the width of said container and disposed below said at least one pug mill shaft and within said region; and
a plurality of homogenizer mixing elements coupled to and radially protruding from said at least one homogenizer shaft for providing a zone of high shear mixing.

16. A mixer in accordance with claim 15 further comprising means for rotating said at least one homogenizer shaft at 800 to 1500 rpm.

17. A mixer comprising:
a container for containing a mixture and having a feed port through which components of said mixture are fed to said container;
two parallel pug mill shafts, which rotate in opposite rotational directions, contained within said container and extending in a first direction;
a plurality of pug mill paddles, coupled to and radially protruding from said pug mill shafts for mixing said mixture and transporting said mixture through a region in said first direction as said mixture is mixed;
a plurality of pug mill paddle sets of pug mill paddles, wherein:
(a) each of said pug mill paddle sets comprises at least two of said pug mill paddles evenly spaced around said pug mill shafts,
(b) said plurality of pug mill paddle sets are evenly spaced along the length of said pug mill shafts, and
(c) said plurality of pug mill paddle sets along the length of said pug mill shafts are interrupted to define an interrupted area shafts to two parallel homogenizer shafts contained within said container below said pug mill shafts and extending in a second direction transverse to said first direction and extending through said region at said interrupted area of pug mill paddle sets;
a plurality of homogenizer mixing elements coupled to and radially protruding from said homogenizer shafts; and
a plurality of homogenizer mixing element sets of homogenizer mixing elements, wherein:
(a) each of said homogenizer mixing element sets comprises at least two of said homogenizer mixing elements evenly spaced around said homogenizer shafts, and
(b) said plurality of homogenizer mixing element sets are evenly spaced along the length of said homogenizer shafts.

* * * * *